United States Patent
Furuta et al.

(10) Patent No.: US 6,243,256 B1
(45) Date of Patent: Jun. 5, 2001

(54) ELECTRODE FOIL FOR SOLID ELECTROLYTIC CAPACITOR, MANUFACTURING METHOD THEREOF, AND SOLID ELECTROLYTIC CAPACITOR

(75) Inventors: Yuji Furuta; Katsuhiko Yamazaki; Atsushi Sakai, all of Nagano-ken; Hiroshi Konuma, Chiba-ken, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/433,582

(22) Filed: Nov. 4, 1999

Related U.S. Application Data
(60) Provisional application No. 60/107,001, filed on Nov. 4, 1998, now abandoned.

(30) Foreign Application Priority Data

Jun. 9, 1998 (JP) .................................................. 10-161133

(51) Int. Cl.$^7$ ....................................................... H01G 9/04
(52) U.S. Cl. ........................... 361/528; 361/528; 361/508; 361/509; 29/25.03
(58) Field of Search .................................. 361/528, 509, 361/508, 529, 525; 29/25.03

(56) References Cited

U.S. PATENT DOCUMENTS

| | | | |
|---|---|---|---|
| 5,062,025 | * 10/1991 | Verhoeven et al. | 361/525 |
| 5,586,001 | * 12/1996 | Amano et al. | 361/525 |
| 5,968,210 | * 10/1999 | Strange et al. | 29/25.03 |

FOREIGN PATENT DOCUMENTS

| | | |
|---|---|---|
| 1-184912 | 7/1989 | (JP) . |
| 3-65010 | 10/1991 | (JP) . |
| 6-14465 | 4/1994 | (JP) . |
| 407094370 | * 4/1995 | (JP) . |

* cited by examiner

*Primary Examiner*—Dean A. Reichard
*Assistant Examiner*—Nguyen Ha
(74) *Attorney, Agent, or Firm*—Sughrue, Mion, Zinn, Macpeak & Seas, PLLC

(57) ABSTRACT

The present invention is an aluminum electrode foil used in a solid electrolytic capacitor, and provides an electrode foil for a solid electrolytic capacitor, a manufacturing method of this electrode foil, and a solid electrolytic capacitor using this electrode foil having an improved voltage resistance and heat resistance at the cut-end part without causing a reduction in the effective area of the electrode foil. According to the manufacturing method of the electrode foil for the solid electrolytic capacitor according to the present invention, a porous film 11 having a thickness within the range of from about 5 to about 100 times the thickness of the barrier film 3 is formed on the surface of an electrode foil 10, on the cut-end part 5 of this electrode foil 10. In addition, the present invention provides an electrode foil manufactured according to the above described manufacturing method and a solid electrolytic capacitor using this electrode foil.

4 Claims, 2 Drawing Sheets

ELECTRODE FOIL FOR SOLID ELECTROLYTIC CAPACITOR, MANUFACTURING METHOD THEREOF, AND SOLID ELECTROLYTIC CAPACITOR

CROSS REFERENCE TO RELATED APPLICATIONS

This application is a continuation application of PCT/JP99/02937, filed Jun. 2, 1999, pursuant to the provisions of 35 U.S.C. § 111. This Application is also an Application filed under 35 U.S.C. § 111(a) claiming benefit pursuant to 35 U.S.C. § 119(e)(1) of the filing date of Provisional Application 60/107,001 filed Nov. 4, 1998 now abandoned.

BACKGROUND OF THE INVENTION

1. Field of the Invention

The present invention relates to an electrode foil for a solid electrolytic capacitor, comprising a formed aluminum foil and having an improved voltage resistance and heat resistance at the cut-end part of the foil. The present invention also relates to a manufacturing method thereof and a solid electrolytic capacitor using the electrode foil.

2. Description of Related Art

Solid electrolytic capacitors use an electrode foil obtained by forming a dielectric layer comprising an anodic oxide film on the surface of an aluminum foil. This electrode foil is commonly manufactured by dipping an aluminum foil in an acidic electrolytic solution to effect a forming treatment on the surface thereof by an anodic oxidation process using the aluminum foil as an anode pole, and then cutting the foil into a predetermined size. In recent years, down-sizing of electrolytic capacitors for the low-voltage use is proceeding in the field of electronic equipments, and to cope with this, a high electrostatic capacitance per the area is demanded. Accordingly, in the production of an electrode foil for the low-voltage use, a forming treatment has been conventionally performed, wherein, as shown in FIG. 3, an aluminum foil is subjected to a surface roughening treatment by AC etching the foil in an electrolytic solution containing, for example, chloride ions to form a large number of pores 2 having a pore diameter of, for example, about 0.2 $\mu$m on the surface thereof, so that the effective surface area of the aluminum foil can be enlarged. Thereafter, a thin and dense, uniform barrier film (anodic oxide film) 3 having few defects and a thickness of approximately from 0.01 to 0.1 $\mu$m is formed on each surface of the aluminum foil, including inner surfaces of these pores. In the thus-obtained formed foil, a large number of pores 2 are formed on both surfaces of a core part 1 comprising an aluminum core metal, and on each surface having an effective area enlarged by the pores, the dense, uniform barrier film 3 having few defects is formed as a dielectric layer.

The formed foil obtained is cut into a size predetermined for respective small solid electrolytic capacitors for the low-voltage use, and then used as an electrode foil. At this time, the aluminum core metal is exposed at the cut-end part 5 of the electrode foil and the electrode cannot be integrated as it is into a solid electrolytic capacitor, but must be insulated. This cut-end part 5 is usually insulated by again subjecting the formed foil cut out to a forming treatment (hereinafter referred to as a "cut-end-forming") to form a barrier film on this cut-end part 5. The above-described formed foil is usually cut using the shearing force of a knife edge and accordingly, the aluminum core metal is exposed and made pointed at the cut-end part 5 to form a pinnacle part 6. If the cut-end part in this state is subjected to a cut-end-forming to form a barrier film on the cut-end part 5, heat is locally generated as a result of concentration of the electric current due to the pinnacle shape during voltage loading, and the barrier film may be ruptured by the thermal stress or other disadvantageous results are caused. Thus, the voltage resistance and heat resistance of the solid electrolytic capacitor is extremely reduced. Furthermore, if a surface roughening treatment or a cut-end-forming at a high voltage is carried out in the same manner as described above, in the case that the dielectric layer at the cut-end part 5 is reinforced, the barrier film 3 which has been already formed on each surface of the formed foil may be ruptured in either case.

Therefore, a method of insulating the cut-end part by covering it with a resin or the like, but without the formation of an anodic oxide film, has been proposed (see, for example, examined Japanese Utility Model Publication, No. Hei 6-14465). According to this method, however, the resin layer extends also to the surface of the electrode foil to thereby reduce the electrostatic capacitance the capacitor, and this controverts the requirement for down-sizing. Furthermore, the process is complicated and in turn, the production cost increases.

The present invention has been created to overcome the above-described problems, and accordingly, the object of the present invention is to provide a method for manufacturing an inexpensive electrode foil for a solid electrolytic capacitor by forming a voltage-resistant and heat-resistant film only on the cut-end part without causing any reduction in the effective area of the electrode foil, as well as an electrode foil for a solid electrolytic capacitor manufactured by this method, and a solid electrolytic capacitor using this electrode foil.

SUMMARY OF THE INVENTION

For solving the above-described problems, the present invention provides a method for manufacturing an electrode foil for a solid electrolytic capacitor, comprising etching an aluminum foil to roughen the surface thereof, subjecting the foil to a forming treatment to form a barrier film as a dielectric layer on each roughened surface, cutting the formed foil into a predetermined size, and subjecting the cut out formed foil to a forming treatment to form a porous film on the cut-end part, the porous film being a porous oxide film and having a thickness in the range of from about 5 to about 100 times the thickness of the barrier film. In this method, the porous film formed is preferably further subjected to a forming treatment to form a cut-end barrier film in the base layer of the porous film.

The present invention also provides an electrode foil for a solid electrolytic capacitor, manufactured by any one of the above-described manufacturing methods, and a solid electrolytic capacitor manufactured by using this electrode foil for a solid electrolytic capacitor.

Hereinafter, the electrode foil for a solid electrolytic capacitor and the solid electrolytic capacitor are referred to as an "electrode foil" and a "capacitor", respectively.

DESCRIPTION OF THE PREFERRED EMBODIMENT

A preferred embodiment for carrying out the present invention is described below.

In manufacturing an electrode foil of the present invention, an aluminum foil is first etched in the same manner as in conventional techniques to roughen the surface. Thereafter, the foil is subjected to a forming treatment to form a barrier film as a dielectric layer on each roughened surface of the aluminum foil, thereby producing a formed foil. The formed foil obtained is cut into a predetermined size required for an electrode foil of a capacitor.

This formed foil cut out is subjected to a forming treatment (cut-end-forming) to form a porous film on the cut-end part. The porous film is a porous oxide film, and has a thickness within the range of from about 5 to about 100 times, preferably from about 20 to about 100 times the thickness of the barrier film.

The cut-end-forming in the present invention may be carried out by dipping a cut out formed foil in an electrolytic solution containing an acid such as phosphoric acid, oxalic acid, and sulfuric acid, and applying thereto a constant current using the core part comprising an aluminum core metal of the foil as an anode.

Figure 1:
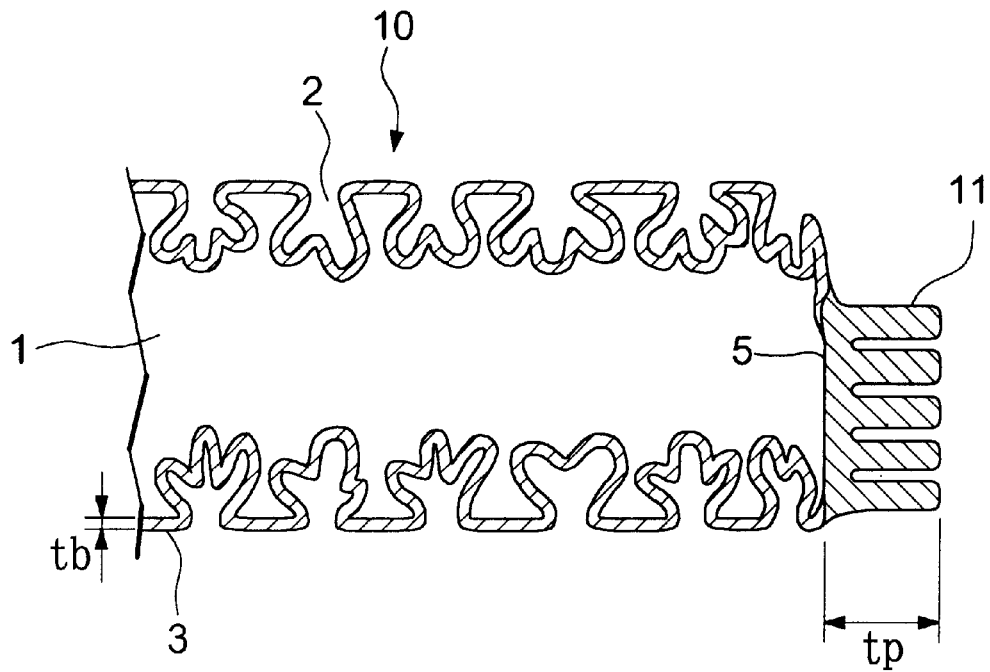
FIG. 1 is a cross-sectional view showing one example of an electrode foil of the present invention.

As shown in FIG. 1, the thus-obtained electrode foil 10 of the present invention has a constitution such that a large number of pores 2 are formed on the surface of the core part 1 comprising an aluminum core metal, and the barrier film 3 as a dielectric layer is formed on both surfaces, each having an effective area enlarged by the pores. A porous film 11 is formed on the cut-end part 5, the film comprising an oxide film covering the surface exposing the aluminum core metal and aluminum oxide developed with a column shape from the oxide film with each column having a hole in the center. Thus, the porous film 11 provides a thick cover on the cut-end part 5. The thickness tp of this porous film 11 may be from about 5 to about 100 times, preferably from about 20 to about 100 times of the thickness tb of the barrier film 3.

Figure 3:
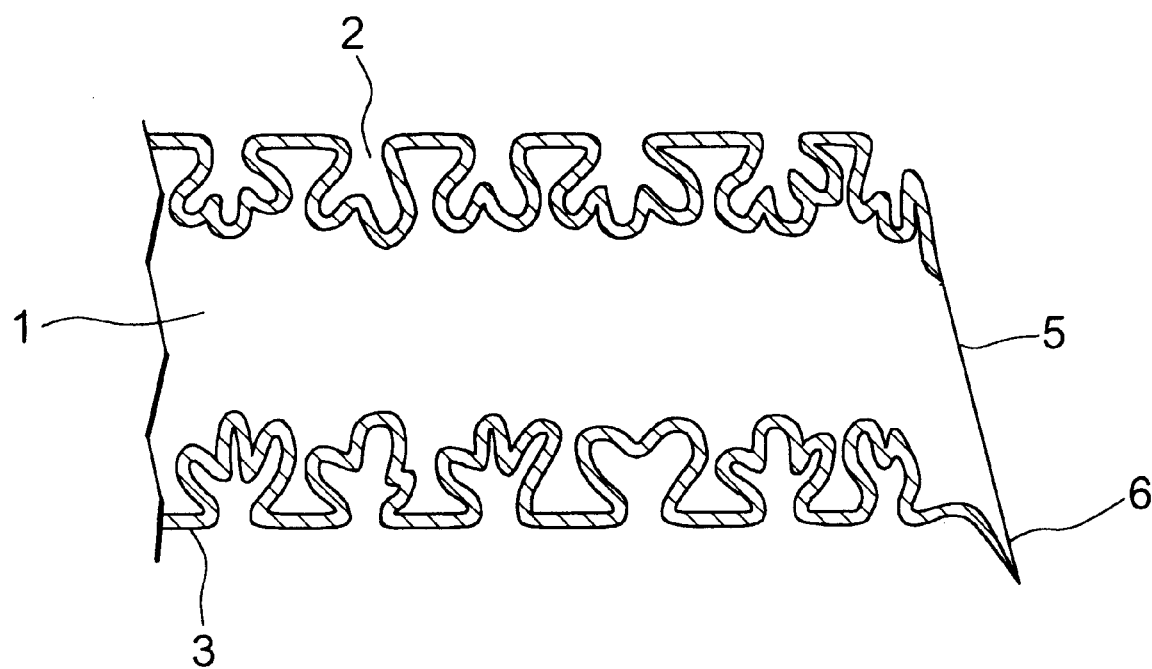
FIG. 3 is a cross-sectional view showing a cut out formed foil.

It has been found that by applying the above-described cut-end-forming, a part of the pinnacle part 6 shown in FIG. 3 disappears from the cut-end part 5 of the electrode foil 10, and the pinnacle shape of the cut-end part is smoothed. This is considered to occur because during the cut-end-forming in the present invention, at least a part of the pinnacle part dissolves in an acidic electrolytic solution in advance of the formation of the porous film 11 on the cut-end part 5.

The porous film 11 is formed by turning on the electric current using the aluminum core part 1 of the formed foil as an anode, accordingly, if the conditions when the electric current is turned on are appropriately selected, the porous film can be selectively formed only on the part exposing the aluminum core metal of the cut-end part 5 without damaging the barrier film 3 formed on the effective surface of the formed foil. As a result, even when the porous film 11 is formed, the electrode foil 10 used for a capacitor is not reduced in the effective area or insulating characteristics.

In the electrode foil 10, the pinnacle shape of the cut-end part 5 is smoothed and moreover, the porous film 11 formed on the cut-end part 5 has a sufficiently large thickness as compared with an ordinary barrier film, and also has a buffer action against the solid electrolytic layer and electrically conducting layer formed on the film. Accordingly, the electrode film 10 not only attains high insulating characteristics, but also high resistance against the mechanical stress or thermal stress. Due to this, the capacitor can prevent a reduction in the voltage resistance or heat resistance due to the cut-end part 5.

Figure 2:
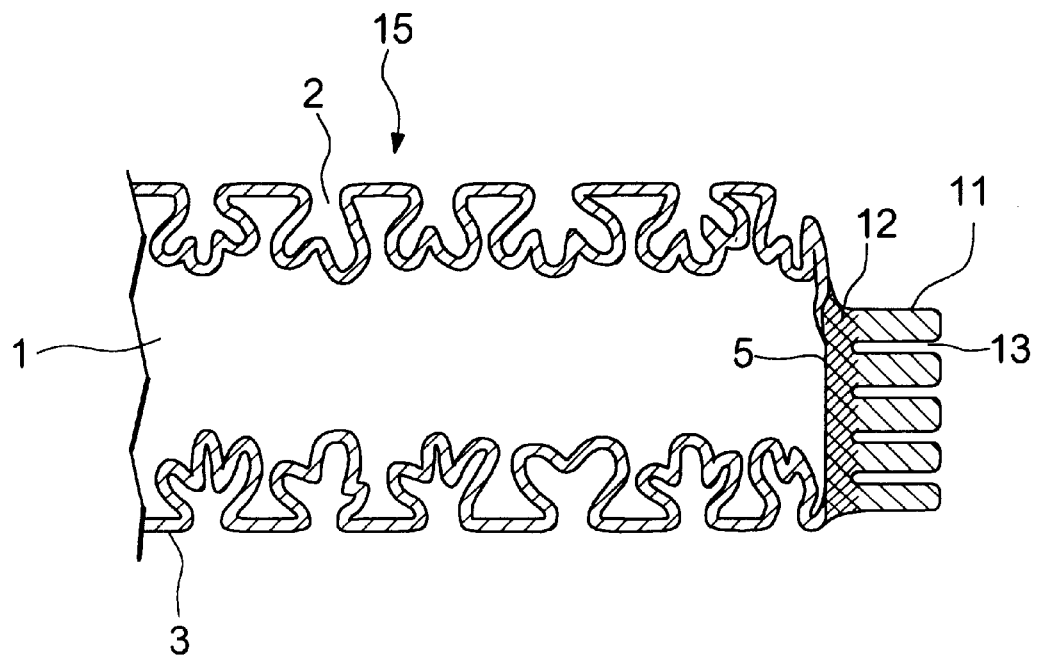
FIG. 2 is a cross-sectional view showing another example of an electrode foil of the present invention.

According to a more preferred embodiment for practicing the present invention shown as electrode foil 15 in FIG. 2, the cut-end part 5 after the formation of the porous film 11 is further subjected to a forming treatment to form a barrier film (cut-end-barrier film) 12 in the base layer of the porous film 11. This forming treatment may be performed, for example, by dipping the above-described electrode foil 10 having formed thereon the porous film 11 in an electrolytic solution containing an acid such as adipic acid, boric acid or phosphoric acid, and then applying thereto a constant current using the aluminum core part 1 as an anode. At the time of this anodic oxidation, the electrolytic solution permeates into the pores 13 of the crystal columns of the porous film 11 to form a cut-end-barrier film 12 in the base layer of the porous film 11. The cut-end-barrier film 12 formed shows a voltage resistance substantially equal to that of the barrier film 3.

In the electrode foil 15 obtained, the cut-end part 5 is covered twofold with a dense, uniform cut-end-barrier film 12 having few defects, and then with a porous film 11 having a buffer action and a large thickness thereon. Accordingly, the protection by the film is enhanced and both the voltage resistance and the heat resistance are remarkably improved. The enhanced protection by the film is important particularly in the case of a solid electrolytic capacitor using no electrolytic solution, because the barrier film is scarcely capable of self-maintenance.

In the manufacture of a capacitor using the electrode foil 10 or 15, only the simple anodic oxidation is repeated so that the pinnacle part of the cut-end part 5 can be smoothed, a porous film 11 having a highly buffer action and a large thickness can be formed, and preferably a dense, highly strong and uniform cut end barrier film 12 having few defects can be further formed in the base layer of the porous film. Accordingly, the capacitor can be manufactured at a low cost, and moreover the capacitor has an excellent voltage resistance, heat resistance, and impact strength, free of reduction in the electrostatic capacitance and capable of satisfying the requirement for down-sizing.

The electrode foil according to the present invention can be applied to a solid electrolytic capacitor, and it is possible to form the solid electrolyte according to well-known methods. Preferably, an electrically conducting polymer is used, and a chemical polymerization or electrolytic polymerization method can be used.

Preferably, in the chemical polymerization method, the resistance to the thermal stress and mechanical stress is increased in the case of forming the polymer by dipping in a monomer solution of the polymer and an oxidizing solution.

In addition, any compound having a doping capacity, for example, organic sulfonic acid, inorganic sulfonic acid, organic carboxylic acid, and the salts thereof, can be used as a dopant. In particular, as a compound that can exhibit superior capacitor properties, it is possible to use a compound having one or more sulfonic acid group and a quinone structure in a molecule, heterocyclic sulfonic acid, anthracenemonosulfonic acid, and the salts thereof.

The present invention is described in more detail below.

In manufacturing the electrode foil of the present invention, first, the aluminum foil is subjected to surface roughening. The method for roughening the surface is known. In the manufacture particularly of an electrode foil for use in a small sized solid electrolytic capacitor for low-voltage application, an aluminum foil roll having, for example, a width of 500 mm and a thickness of 100 μm is etched by the alternating current method in an electrolytic solution containing chloride ions, such as hydrochloric acid or aluminum chloride, whereby pores having, for example, a depth of about 35 μm and an average pore diameter of about 0.2 μm are formed throughout both surfaces of the foil, and the effective area of the foil is enlarged to about 100 times.

This surface-roughened aluminum foil is then subjected to a forming treatment using a relatively mild acidic electrolytic solution such as an adipic acid, a boric acid, or a phosphoric acid according to an ordinary method of forming a barrier film 2 having, for example, a thickness of about 0.03 μm on the enlarged surface. The formed foil obtained is cut into a size predetermined for an electrode foil.

The formed foil cut out is then subjected to a cut-end-forming treatment. In the present invention, the cut-end-forming for forming a porous film 11 is carried out under the conditions such that the surface exposing the aluminum core metal has a thickness of from about 5 to about 100 times, preferably from about 20 to about 100 times the thickness of the barrier film 3. The forming conditions for formation of a porous film 11 are not particularly limited, however, for example, the forming treatment by a constant current is carried out in an electrolytic solution containing at least one selected from phosphoric, oxalic, and sulfuric acid, using the core part 1 of the formed foil as an anode under the conditions such that the concentration of the electrolytic solution is from 0.1 to 30 wt %, the temperature is from 0 to 80° C., the current density is from 0.1 to 1,000 mA/cm$^2$, and the forming treatment time is 100 minutes or less. The conditions are preferably selected such that the concentration of the electrolytic solution is from 1 to 20 wt %, the temperature is from 20 to 50° C., the current density is from 1 to 400 mA/cm$^2$, and the forming treatment time is 60 minutes or less. A porous film 11 having a thickness of approximately from 0.5 μm to a few μm can be generated by a forming treatment under such conditions.

The above-described forming conditions are preferred for an industrial method, however, various conditions such as the kind of the electrolytic solution, the concentration of the electrolytic solution, the temperature, the current density, and the forming treatment time may be freely selected so far as the barrier film 3 which has been formed on the surface of the formed foil does not rupture or deteriorate.

The thickness of the porous film 11 formed falls within the range of from about 5 to about 100 times the thickness of the barrier film 3 formed on the surface of the formed foil. If the film thickness is as small as less than 5 times, the effect resulting from forming the porous film cannot be demonstrated, whereas even if the film thickness exceeds 100 times, the effect does not further increase, and on the contrary, an industrially disadvantageous effect may result because it is difficult to select the conditions for generating a thick film without causing rupture or deterioration of the barrier film on the formed foil. When the thickness of the porous film 11 is selected particularly to fall within the range of from about 20 to about 100 times the thickness of the barrier film 3, the electrode foil obtained is remarkably improved both in the voltage resistance and the heat resistance.

A porous film has been conventionally used as an intermediate means for the purpose of forming a highly voltage resistant barrier film on the effective surface of an aluminum foil in middle- or high-voltage aluminum electrolytic capacitors (see, for example, unexamined published Japanese Patent Application, No. Hei 1-184912 and examined Japanese Patent Application, No. Hei 3-65010). However, these all are electrolytic solution-type capacitors, and since the holes 13 of the porous film formed (see, FIG. 2) are mostly filled with an oxide, the film is no longer porous, and does not have a buffer action or the like. The electrode foil of the present invention allows the porous film to be present as it is, and exhibits a buffer effect, and on this point, greatly differs from the conventional techniques.

According to the invention of claim 2 of the present invention, after the formation of the porous film 11, the cut-end part 5 is further subjected to a forming treatment to form a cut-end-barrier film 12 in the base layer of the porous film. The conditions for this forming treatment are not particularly limited, however, for example, a constant current forming is performed in an electrolytic solution containing at least one selected from adipic, boric and phosphoric acid using the core part 1 of the formed foil as an anode under the conditions such that the concentration of the electrolytic solution is from 0.05 to 20 wt %, the temperature is from 0 to 90° C., the current density is from 0.1 to 2,000 mA/cm$^2$, and the forming treatment time is 60 minutes or less. The conditions are preferably selected such that the concentration of the electrolytic solution is from 0.1 to 15 wt %, the temperature is from 20 to 70° C., the current density is from 1 to 1,200 mA/cm$^2$, and the forming treatment time is 30 minutes or less.

The above-described forming conditions are preferred for an industrial method, however, since sufficient if a barrier film 12 having a voltage resistance equal to or greater than the voltage resistance of the barrier film 3 formed on the effective surface of the electrode foil is formed on the cut-end part 5, various conditions such as the kind of the electrolytic solution, the concentration of the electrolytic solution, the temperature, the current density, and the forming treatment time may be freely selected as far as the barrier film 3 which has been formed on the surface of the formed foil is not ruptured or deteriorated.

Before or after either of those forming treatments, the foil may be subjected, for example, to a dipping treatment in a phosphoric acid so as to improve water resistance or to a heat treatment or dipping treatment in boiling water so as to reinforce the film, if desired. These incidental treatments, the above-described barrier film forming treatments, and the porous film forming treatments may be repeated individually or in combination.

In the foregoing, while the present invention is described by referring to a low-voltage solid electrolytic capacitor, the present invention can of course be applied also to middle- or high-voltage solid electrolytic capacitors.

EXAMPLES

Example 1

An aluminum foil having surfaces roughened by alternating current (AC) etching was subjected to a forming treatment in an aqueous ammonium adipate solution at a voltage of 32 V. The formed foil for a low-voltage capacitor obtained was cut into a size of 3×7 mm. One of the short side parts of this formed foil specimen was welded to an electrode bar (a metal plate), and the foil at 5 mm from the end of the opposite welded part was masked round at a width of 0.6 mm with an insulating resin. The remaining three sides under the masked part were subjected to a forming treatment under the following conditions to form a porous film.

| Electrolytic solution: aqueous solution containing 7.5 wt % of oxalic acid | |
|---|---|
| Temperature: | 35° C. |
| Voltage: | 32 V |
| Current density: | 180 mA/cm$^2$ |
| Forming treatment time: | 13 minutes |

Thereafter, the specimen was heat-treated at 350° C. for 30 minutes and then subjected to a forming treatment under the following conditions to form a cut-end-barrier film in the base layer of the porous film.

| Electrolytic solution: aqueous solution containing 10 wt % of adipic acid | |
|---|---|
| Temperature: | 45° C. |
| Voltage: | 32 V |
| Current density: | 180 mA/cm$^2$ |
| Forming treatment time: | 10 minutes |

The surface of the electrode foil obtained after washing and drying is dipped in a 1 mol/l isopropyl alcohol solution of a 3,4-ethylenedioxythiophene and dried for 2 min, then dipped in a mixed aqueous solution of an oxidizing agent (ammonium persulfate; 1.8 mol/l) and a dopant (sodium 4-morpholinepropane sulfonate; 0.06 mol/l) for 5 minutes at 45° C. An electrically conducting polymer layer is formed by repeating this process 25 times and washing.

Thereafter, an electrically conducting layer is formed thereon by sequentially stacking a carbon paste and a silver paste. Next, this foil specimen was separated from the electrode bar, stacked with 4 layers of at the silver paste application part, made the cathode, and then connected to a lead frame. Next, the part not having the conducting polymer formed is welded to the lead frame and made the anode. In addition, the entire capacitor element is molded with an epoxy resin and is treated with aging 105° C. at 20 V for 3 hours to manufacture a capacitor of Example 1.

Example 2

Instead of the 13 minutes forming time in the porous film forming treatment process of Example 1, a capacitor of Example 2 was manufactured in the same manner as in Example 1 except for changing the forming treatment time in the porous film forming treatment process to 10 minutes.

Example 3

Instead of the 13 minutes forming time in the porous film forming treatment process of Example 1, a capacitor of Example 3 was manufactured in the same manner as in Example 1 except for changing the forming treatment time in the porous film forming treatment process to 7 minutes.

Example 4

Instead of the 13 minutes forming time in the porous film forming treatment process of Example 1, a capacitor of Example 4 was manufactured in the same manner as in Example 1 except for changing the forming treatment time in the porous film forming treatment process to 4 minutes.

Example 5

Instead of the 13 minutes forming time in the porous film forming treatment process of Example 1, a capacitor of Example 5 was manufactured in the same manner as in Example 1 except for changing the forming treatment time in the porous film forming treatment process to 2 minutes.

Example 6

A capacitor of Example 6 was manufactured in the same manner as in Example 1 except that the aluminum foil having surfaces roughened by an AC etching was subjected to a forming treatment in an aqueous ammonium adipate solution at a voltage of 23 V, and the forming treatment time in the porous film forming treatment process was changed to 9 minutes.

Example 7

Instead of the 9 minutes forming time in the porous film forming treatment process of Example 6, a capacitor of Example 7 was manufactured in the same manner as in Example 6 except for changing the forming treatment time in the porous film forming treatment process to 7 minutes.

Example 8

Instead of the 9 minutes forming time in the porous film forming treatment process of Example 6, a capacitor of Example 8 was manufactured in the same manner as in Example 6 except for changing the forming treatment time in the porous film forming treatment process to 4 minutes.

Example 9

Instead of the 9 minutes forming time in the porous film forming treatment process of Example 6, a capacitor of Example 9 was manufactured in the same manner as in Example 6 except for changing the forming treatment time in the porous film forming treatment process to 2 minutes.

Example 10

Instead of the 9 minutes forming time in the porous film forming treatment process of Example 6, a capacitor of Example 10 was manufactured in the same manner as in Example 6 except for changing the forming treatment time in the porous film forming treatment process to 1 minute.

Example 11

Instead of using the sodium 4-morpholinepropanesulfonate in the dopant of Example 1, sodium anthraquinone-2-sulfonate was used. Otherwise, a capacitor of Example 11 was manufactured in the same manner as Example 1.

Example 12

Instead of using the 3,4-ethylenedioxythiophene in Example 1, N-methylpyrrole was used, and instead of the sodium 4-morpholinepropanesulfonate in the dopant, sodium 1-naphthalenesulfonate was used. Otherwise, a capacitor of Example 12 was manufactured in the same manner as Example 1.

Example 13

Instead of using the 3,4-ethylenedioxythiophene in Example 1, isothianaphthene was used, and instead of mixed aqueous solution of an oxidizing agent (ammonium persulfate; 1.8 mol/l) and a dopant (sodium 4-morpholinepropanesulfonate; 0.06 mol/l), a mixture of an oxidizing agent (2,3-dichloro-5,6-dicyanobenzoquinone;

1.8 mol/l) dioxane solution and a dopant (sodium anthracene-1-sulfonate; 0.06 mol/l) aqueous solution were used. Otherwise, a capacitor of Example 13 was manufactured in the same manner as Example 1.

Example 14

An aluminum foil roughened by AC etching is formed at 23 V in ammonium adipate solution, and in the above-described porous film forming process, the forming time is 9 minutes. Otherwise, a capacitor of Example 14 was manufactured in the same manner as Example 11.

Example 15

An aluminum foil roughened by AC etching is formed at 23 V in ammonium adipate solution, and in the above-described porous film forming process, the forming time is 9 minutes. Otherwise, a capacitor of Example 15 was manufactured in the same manner as Example 12.

Example 16

An aluminum foil roughened by AC etching is formed at 23 V in ammonium adipate solution, and in the above-described porous film forming process, the forming time is 9 minutes. Otherwise, a capacitor of Example 16 was manufactured in the same manner as Example 13.

Comparative Example 1

A capacitor of Comparative Example 1 was manufactured in the same manner as in Example 1 except for omitting the porous film forming treatment process.

Comparative Example 2

Instead of the 13 minutes forming time in the porous film forming treatment process of Example 1, a capacitor of Comparative Example 2 was manufactured in the same manner as in Example 1 except for changing the forming treatment time in the porous film forming treatment process to 20 seconds.

Comparative Example 3

Instead of the 13 minutes forming time in the porous film forming treatment process of Example 1, a capacitor of Comparative Example 3 was manufactured in the same manner as in Example 1 except for changing the forming treatment time in the porous film forming treatment process to 20 minutes.

Each of the capacitors obtained was measured on the thickness for the porous film (measured by a scanning electron microscope), the thickness multiple of the porous film to the barrier film, the defect ratio for the voltage resistance, and the reflow soldering defect ratio.

Here, with respect to the voltage resistance defect ratio, for 20 capacitors, a voltage 1.25 times the rated voltage was applied at 85° C., and after repeating 1000 a cycle of charging for 30 seconds and discharging for 30 seconds, all capacitors having a leakage current equal to or greater than 0.04 CV ($\mu$A)[CV($\mu$A) is the product of the nominal electrostatic capacitance C ($\mu$F) and the rated voltage V (v) were determined as effective, and the ratio is shown by the (number of defectives/number of test samples). With respect to the reflow soldering defect ratio, for 30 capacitors, after processing at 230° C. for 30 seconds using a reflow furnace, capacitors whose leakage current was equal to or greater than 0.04 CV ($\mu$A) were determined as defective, and the ratio is shown by the (number of defectives/number of test samples).

The test results are shown in Table 1.

TABLE 1

| | Thickness of Porous Film | Thickness Multiple | Voltage Resistance Defect Ratio | Reflow Soldering Defect Ratio |
|---|---|---|---|---|
| Example 1 | 3.9 $\mu$m | 93 times | 0/20 | 0/30 |
| Example 2 | 2.9 $\mu$m | 69 times | 0/20 | 0/30 |
| Example 3 | 2.0 $\mu$m | 48 times | 0/20 | 0/30 |
| Example 4 | 1.2 $\mu$m | 29 times | 0/20 | 0/30 |
| Example 5 | 0.6 $\mu$m | 14 times | 0/20 | 1/30 |
| Example 6 | 2.7 $\mu$m | 90 times | 0/20 | 0/30 |
| Example 7 | 1.9 $\mu$m | 63 times | 0/20 | 0/30 |
| Example 8 | 1.2 $\mu$m | 40 times | 0/20 | 0/30 |
| Example 9 | 0.7 $\mu$m | 23 times | 0/20 | 0/30 |
| Example 10 | 0.3 $\mu$m | 10 times | 1/20 | 1/30 |
| Example 11 | 3.8 $\mu$m | 90 times | 0/20 | 0/30 |
| Example 12 | 3.6 $\mu$m | 86 times | 0/20 | 0/30 |
| Example 13 | 3.2 $\mu$m | 82 times | 0/20 | 0/30 |
| Example 14 | 2.5 $\mu$m | 88 times | 0/20 | 0/30 |
| Example 15 | 2.4 $\mu$m | 86 times | 0/20 | 0/30 |
| Example 16 | 2.1 $\mu$m | 80 times | 0/20 | 0/30 |
| Comparative Example 1 | 0.0 $\mu$m | 0 times | 13/20 | 4/30 |
| Comparative Example 2 | 0.1 $\mu$m | 2.5 times | 7/20 | 4/30 |
| Comparative Example 3 | 6.0 $\mu$m | 143 times | 0/20 | 1/30 |

In any of Examples 1 to 5, Examples 11 to 13, and Comparative Examples 1 to 3, the capacitor used a formed foil for the low-voltage use in which the barrier film forming on the foil surface was carried out at a voltage of 32 V, and in any of Examples 6 to 10 and Examples 14 to 16, the capacitor used a formed foil for the low-voltage use in which the barrier film forming on the foil surface was carried out at a voltage of 23 V. It is seen from Table 1 that in any of Examples 1 to 16 where the thickness multiple of the porous film falls within the range of from about 5 to about 100 times the thickness of the barrier film, excellent results are obtained with respect to the defect ratio for the voltage resistance and the reflow soldering defect ratio, as compared with Comparative Example 1, where a porous film is not formed or Comparative Example 2, where the thickness multiple is less than about 5 times. Particularly, in Examples 1 to 4 and Examples 6 to 9 where the thickness multiple is within the range of from about 20 to about 100 times, both the defect ratio for the voltage resistance and the reflow soldering defect ratio are 0, and thus, remarkable effects are attained as compared with Comparative Examples 1 and 2.

In Comparative Example 3, where a porous film forming treatment for a long period of time was carried out, the thickness multiple exceeds 100 times. Although there is no difference in the performance from the capacitors of the Examples, the film formation conditions in Comparative Example 3 cannot be industrially adopted because the balance between the cost and the performance is not good.

The electrode foil for a solid electrolytic capacitor of the present invention has a constitution such that a porous film having a thickness within the range of from about 5 to about 100 times the thickness of the barrier film formed on the surface of the electrode foil is formed on the cut-end part. Accordingly, a solid electrolytic capacitor remarkably improved in the voltage resistance and heat resistance of the electrode foil can be obtained without causing reduction in the effective area of the electrode foil by a simple and inexpensive manufacturing method. This kind of solid electrolytic capacitor can be used as a capacitor for an electrical device, etc.

What is claimed is:

1. A method for manufacturing an electrode foil for a solid electrolytic capacitor, comprising etching an aluminum foil to roughen the surfaces thereof, subjecting the foil to a forming treatment to form a barrier film as a dielectric layer on each roughened surface; cutting the formed foil into a predetermined size, and subjecting the cut out formed foil to a forming treatment to form a porous film on the cut-end part, the porous film being a porous oxide film and having a thickness in the range of from about 5 to about 100 times the thickness of said barrier film.

2. The method for manufacturing an electrode foil for a solid electrolytic capacitor as claimed in claim 1, wherein said porous film formed is further subjected to a forming treatment to form a cut-end-barrier in a base layer of the porous film.

3. An electrode foil for a solid electrolytic capacitor, produced by the manufacturing method as claimed in claim 1 or 2.

4. A solid electrolytic capacitor produced using an electrode foil for a solid electrolytic capacitor as claimed in claim 3.

* * * * *